US012699549B2

(12) United States Patent　　(10) Patent No.:　US 12,699,549 B2
　　Garfinkle　　　　　　　　　　　(45) Date of Patent:　　Aug. 4, 2026

(54) PROCESSING TEXT DATA USING A HARDWARE COMPUTING SYSTEM

(71) Applicant: Richard Garfinkle, Chicago, IL (US)

(72) Inventor: Richard Garfinkle, Chicago, IL (US)

( * ) Notice: Subject to any disclaimer, the term of this patent is extended or adjusted under 35 U.S.C. 154(b) by 340 days.

(21) Appl. No.: 18/594,468

(22) Filed: Mar. 4, 2024

(65) Prior Publication Data

US 2025/0278253 A1　　Sep. 4, 2025

(51) Int. Cl.
*G06F 8/30*　　　　(2018.01)
*G06F 11/3604*　　(2025.01)

(52) U.S. Cl.
CPC .......... *G06F 8/315* (2013.01); *G06F 11/3608* (2013.01)

(58) Field of Classification Search
CPC ............................. G06F 8/315; G06F 11/3608
See application file for complete search history.

(56) References Cited

U.S. PATENT DOCUMENTS

| | | | | | |
|---|---|---|---|---|---|
| 5,594,837 | A | * | 1/1997 | Noyes ...................... | G06N 5/02 |
| | | | | | 706/50 |
| 2009/0119578 | A1 | * | 5/2009 | Relyea .................... | G06F 9/541 |
| | | | | | 715/234 |
| 2016/0321226 | A1 | * | 11/2016 | Keslin ................... | G06F 16/178 |
| 2021/0042464 | A1 | * | 2/2021 | Hwang ................. | G06F 16/338 |
| 2021/0383584 | A1 | * | 12/2021 | Zhang ....................... | G06T 3/40 |

* cited by examiner

*Primary Examiner* — Seth A Silverman
(74) *Attorney, Agent, or Firm* — Schwegman, Lundberg & Woessner, P.A.

(57)　　　　　　　ABSTRACT

Various examples described herein are directed to systems and methods for processing at least one document. A data store associated with the computing system may store a text editor object. The text editor object may comprise text editing code and a plurality of concept objects. The text editor object may also comprise a tenor object comprising tenor code executable to relate a first set of concept objects of the plurality of concept objects.

20 Claims, 8 Drawing Sheets

_200_

202 — LOAD FIRST DOCUMENT DATA

204 — RENDER FIRST DOCUMENT DATA AT DISPLAY

206 — INDICATE CONCEPTS DESCRIBED BY TEXT STRINGS OF RENDERED DD

208 — RECEIVE INDICATION THAT FIRST STRING SELECTED

210 — DISPLAY INDICATION OF CONCEPT DESCRIPTION DATA

300

302  RECEIVE SET OF INPUT CONCEPTS AND TEST CONCEPT

304  ACCESS TEST CONCEPT OBJECT INCLUDING TC KIND VECTOR

306  EXECUTE IC SPIN CODE WITH TC KV TO DETERMINE CONCEPT REL. SCORE

308  STORE CONCEPT RELATIONSHIP SCORE

310  LAST IC?

312  NEXT IC

314  DETERMINE CONCEPT SET RELATIONSHIP SCORE

400

402 — LOAD FIRST DOCUMENT DATA

404 — LOAD SECOND DOCUMENT DATA

406 — RENDER SECOND DOCUMENT DATA AT DISPLAY

408 — INDICATE CONCEPTS BY TEXT STRINGS OF RENDERED 2ND DD

410 — DETERMINE CONCEPT REL. SCORE FOR 2ND DOC. AND CONCEPT FROM 1ST DOC.

412 — MODIFY RENDERING OF 2ND DOCUMENT DATA BASED ON RS

500

502 — LOAD FIRST DOCUMENT DATA

504 — LOAD SECOND DOCUMENT DATA

506 — GENERATE CONCEPT REL. SCORE FOR 2$^{ND}$ DOC CONCEPT AND 1$^{ST}$ DOC

508 — MORE CONCEPTS?

YES

510 — NEXT 2$^{ND}$ DOCUMENT CONCEPT

NO

512 — GENERATE DOCUMENT RELATIONSHIP SCORE

600

602 ACCESS TRAINING DOC. DATA

604 EXECUTE MODEL WITH TRAINING DOC. DATA

606 GENERATE REL. SCORE FOR OUTPUT AND TRAINING DOC. DATA

610 DETERMINE ERROR

612 MODIFY MODEL BASED ON ERROR

614 LAST EPOCH?

NO

616 NEXT TRAINING DOC. DATA

YES

618 DONE

PROCESSING TEXT DATA USING A HARDWARE COMPUTING SYSTEM

BACKGROUND

Many modern software applications, including text editor applications, are coded according to concepts of Object Oriented Programming (OOP). According to OOP, a software application includes a set of objects. An object is a data structure that may include an executable code and/or data. An object may include data and/or may include a link to specific data stored at a drive, database, or other data storage. The code included in an object may be executable to implement methods that act on the data of the object, generate data, and/or the like. May be instantiated from various classes. A class defines an object including, for example, the methods included in the object and the kind of data stored by the object.

According to principles of OOP, objects making up a software application are factorized or encapsulated. Factorized or encapsulated objects may operate independently of one another. For example, an object may not access the methods/executable code or data of another object. Instead, one object may call another object according to a set of arguments defined for the called object. In this way, a software developer implementing OOP may not need to be concerned with the internal operations of an object. Instead, the software developer may develop code that simply calls objects according to its defined arguments.

BRIEF DESCRIPTION OF DRAWINGS

The present disclosure is illustrated by way of example and not limitation in the following figures.

DETAILED DESCRIPTION

Figure 1:
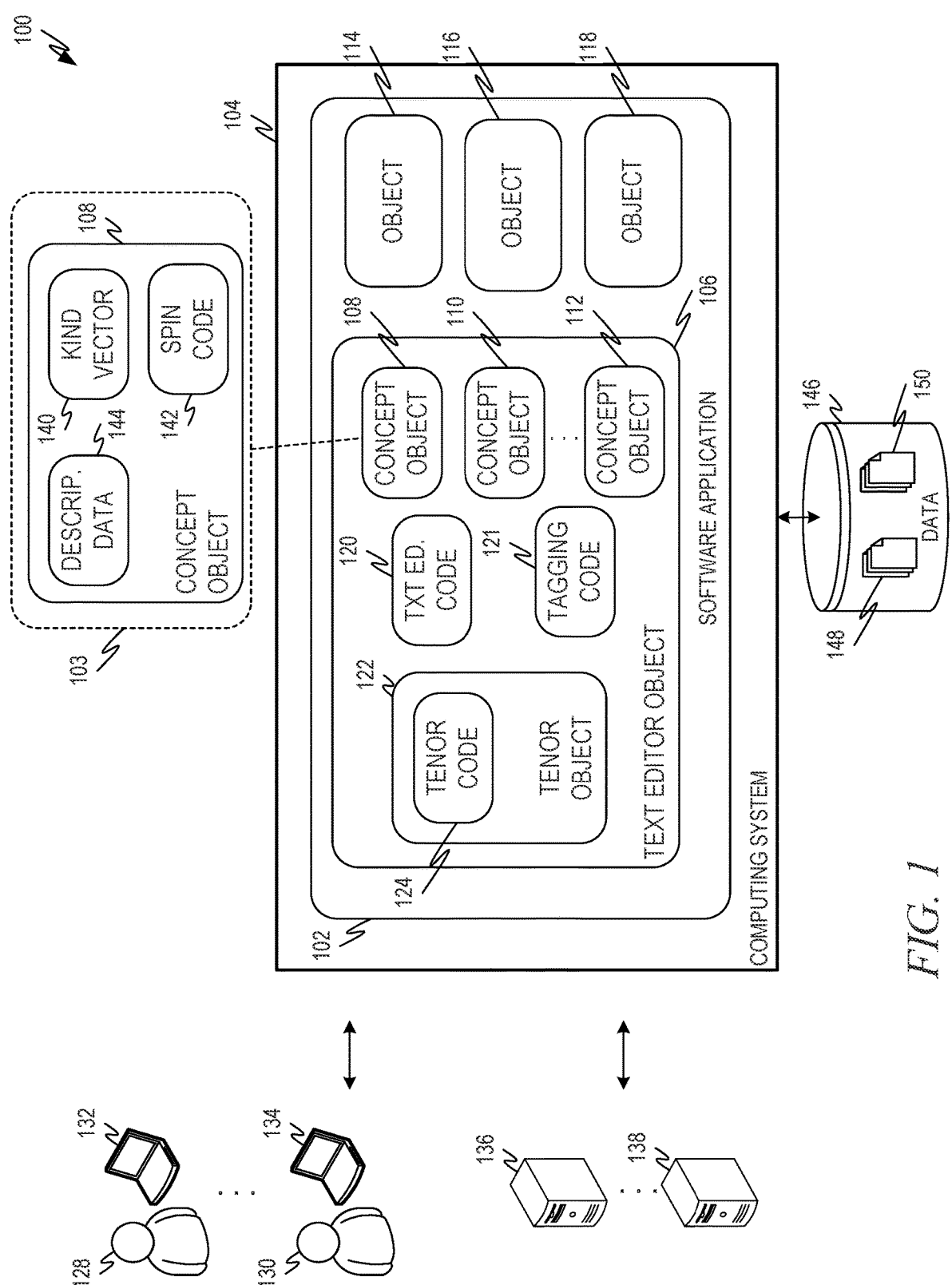
FIG. 1 is a diagram showing one example of an environment comprising a computing system implementing a software application that includes a text editor object.

Various examples are directed to systems and methods for processing text data using a hardware computing system.

Object Oriented Programming (OOP) techniques for software development generate software applications that include multiple independent objects according to a factorized or encapsulated approach. For example, groups of software developers may develop code independently, with independent blocks of code including independent instantiations of various objects. Each developer or group of developers may create a particular object or set of objects that will interact with the objects created by other developers only at a high level. For example, a method within an object may call other objects using defined arguments of the respective objects. In this way, the internal workings of an object may not depend on the internal workings of any other objects. This may simplify the process of development and debugging.

Although the factorized or encapsulated approach of OOP does create efficiencies in code writing and debugging, it also creates certain inefficiencies. For example, it may create inefficiencies in storage. Because each object maintains its own data, it may be difficult to efficiently store data, especially in software applications comprising multiple examples of objects in the same class. Also, changes to data stored by one object may not be propagated to other objects such as, for example, other objects instantiated from the same class. In some examples, encapsulation or factorization may also lead to inefficient execution. For example, a particular combination of interacting objects executing independent methods to perform a particular task may be less efficient than a method specifically coded to perform the task.

Various examples address these and other challenges utilizing software applications comprising entangled objects. Two objects may be entangled, for example, when one object can access data and/or methods of the other object.

In some examples, entangled objects may be used to implement a text editor object comprising various nested objects therein. For example, in addition to text editing methods, the text editor object may include one or more nested concept objects and one or more nested tenor objects. The concept objects describe concepts that may be expressed by text, for example, by text strings in a document. The tenor object may comprise methods and/or data relating the various concept objects to one another. In this way, some or all of the concept objects may be entangled.

A text editor object including entangled objects, as described herein, may provide various advantages over text editor objects utilizing factorization or encapsulation. For example, the text editor object described herein may be used to efficiently relate two documents or other sets of text data by relating concept objects tagged to strings in the respective sets of text data. Comparing objects that share underlying information, such as the entangled objects described herein, may be more efficient than learning methods interpolate between large amounts of data. Utilizing the described tenor object and tenor code to directly access concept objects may increase the efficiency of the determination. Also, capabilities for relating sets of text data, as described herein, may be used, for example, to identify documents expressing similar concepts. Capabilities for relating sets of text data, as described herein, may also be used to train machine learning models, for example, by determining an error based on a difference between two documents.

FIG. 1 is a diagram showing one example of an environment 100 comprising a computing system 104 implementing a software application 102 that includes a text editor object 106. The software application 102 may be any suitable type of software application including, for example, a word processor, a social media web application for creating and or editing social media posts, a textual analysis application for analyzing textual data, and/or the like. In some examples, the software application 102 is arranged to utilize the text editor object 106 to train a machine learning model.

The computing system 104 may be or include any suitable type of computing hardware. For example, the computing system 104 may be or include one or more servers at a common geographic location and/or distributed across multiple geographic locations. In some examples, the computing system 104 may be or include a cloud environment such as a private cloud environment or a public cloud environment.

The software application 102 may comprise various objects 106, 114, 116, 118. The objects 106, 114, 116, 118 may be data structures that include data and executable code for implementing one or more object methods. Objects may be stored at a data storage device of the computing system 104, such as a memory of the computing system 104 or a persistent data storage of the computing system 104. An example persistent data storage 146 of the computing system 104 may be a part of the computing system 104 and/or in communication with the computing system 104. For example, the data storage 146 comprises objects 148 that may be loaded to a memory of the computing system 104 as part of the software application 102 and/or as part of other software applications.

The text editor object 106 comprises text editing code 120. The text editing code 120, when executed by at least one processor of the computing system 104, may cause the computing system 104 to perform one or more methods for editing documents 150. The methods for editing documents may include, for example, one or more methods for loading a document, one or more methods for editing a document, one or more methods for saving a document to the persistent data store 146, and/or the like. Editing a document may include adding text to the document, deleting text from the document, copying text from the document, pasting text to the document, and/or the like.

Documents 150 are data structures comprising a plurality of alphanumeric strings, also referred to herein as text strings. In some examples, some or all of the text strings of a document are ordered. In some examples, some or all of the text strings of a document are arranged according to natural or human readable language. In some examples, a document 150 may be or include a word processing document, a text file, a social media post, a webpage, or any other suitable format including a plurality of text strings.

In addition to the text editor code 120, the text editor object 106 may comprise various nested objects including a plurality of concept objects 108, 110, 112 and a tenor object 122. Concept objects 108, 110, 112 may be associated with respective concepts. A concept is an idea or notion that can be expressed with text strings. Examples of concepts can include people, places, or things, such as, for example, house, car, desk, particular people, and/or the like. Other examples of concepts can include actions such as, for example, walk, fly, talk, build, and/or the like. Also, in some examples, concepts may include descriptors such as, for example, quickly, well, blue, happy, and/or the like.

FIG. 1 shows a breakout window 103 illustrating example components of the concept object 108. In this example, the concept object 108 comprises concept description data 144, kind vector data 140, and spin code 142. It will be appreciated that other concept objects 110, 112 may include similar components.

Concept description data 144 may describe the concept associated with the concept object 108. Concept description data 144 may include, for example, text strings or combinations of text strings that, when used in a document, express or refer to the concept. Text strings indicating the example concept blue may include, for example, navy, sky, cobalt, teal, lapis, and/or the like. Text strings indicating the example concept happy may include, for example, glad, ecstatic, pleased, and/or the like. Concept description data 144 may also include documents or other media describing the concept associated with the concept object 108, or links thereto. For example, the concept description data 144 may include links to one or more web pages, videos, and/or the like describing the concept.

Kind vector data 140 may be or include data light objects that contain shorthand information about relationships between the concept associated with the concept object 108 and other concepts. Data light objects are objects consisting of small amounts of data (for example less than a few kilobytes such as short strings, small arrays of numbers, or small sets of key value pairings between short strings and numbers)

For example, the kind vector data 140 may comprise a set of key and value pairs describing relationships between the concept of the concept object 108 and other concepts. The key of a key and value pair may identify another concept. The value may be a numerical indication of how closely the other concept is associated with the concept of the concept object 108. In some examples, large positive values may indicate a strong positive association between the other concept and the concept of the concept object 108; values near zero may indicate little association between the other concept and the concept of the concept object 108; and large negative values may indicate negative association or antipathy between the other concept and the concept of the concept object 108.

Spin code 142 may be executable to implement a spin method. The spin method, when executed, may transform kind vector data from a target concept (e.g., a target kind vector) into a kind vector that is relevant to the concept associated with the concept object 108, referred to as the source concept. For example, the spin method may operate on the kind vector from the target kind vector and the kind vector data 140 of the source concept (source kind vector). The output of the spin method may provide a set of concepts from the target kind vector that are relevant to the source concept and, in some examples, a multiplier or weight indicating the presence and/or importance of the set of concepts from the target kind vector. In some examples, the output of the spin method may also include, for each concept from the target kind vector, a relevance score. The relevance score may be a numerical indication of the relevance. In this way, the output of the spin method may be similar to the source kind vector. In some examples, the output of the spin method may be appended to or incorporated into the source kind vector.

Consider an example including concept objects labeled A, B, C, and D. The spin code 142 is programmed to apply a programmed weight to indications associated with different concept objects in the kind vectors of other concept objects (keys in values). For example, the spin code 142 may associate the concept object A with the pairs of other concept objects and weights as indicated by TABLE 1 below:

| Concept Object | Weight |
|---|---|
| B | X2.0 |
| C | X0.5 |
| D | X-3.0 |

Accordingly, if the spin code 142, when executed, encounters a key/value pair in another kind vector indicating the concept object A and a weight of, for example, 5, it may transform the reference to the concept object A to three key/value pairs referencing B, C, and D: B/10, C/2.5, D-15.

The tenor object 122 may also be a component of the text editor object 106. The tenor object 122 may comprise tenor code 124 that, when executed by at least one processor of the computing system 104, implements one or more tenor methods. A tenor method may act on multiple concept objects 108, 110, 112 to determine a relationship between a set of two or more documents. For example, a tenor method may access and execute the spin codes and/or kind vectors of various concept objects 108, 110, 112. In this way, the tenor object 122 may be entangled with one or more of the concept objects 108, 110, 112.

In some examples, a tenor method receives as input an indication of a set of input concept objects, for example, selected from the concept objects 108, 110, 112. In some examples, the set of input concept objects may be concepts that are tagged as being expressed in an input document. The tenor method may also receive as input an indication of a test concept object, which may also be selected from the concept objects 108, 110, 112.

The tenor method may access the respective spin codes of the input concept objects from the respective concept objects 108, 110, 112. The tenor method may also access test kind vector data from the test concept object. The tenor method may utilize the respective spin codes and the test kind vector to generate a set of concept relationship scores relating the test concept object to the respective input concept objects. From the resulting concept relationship scores, the tenor method may determine a concept set relationship score that describes a relevance of the test concept object to the set of input concept objects.

In some examples, the tenor method may be executed with respect to one or more input documents. For example, the tenor method may be executed with respect to a single input document to determine the relevance of various test concepts to the input document. Also, in some examples, the tenor method may be executed with respect to multiple documents to determine a document relationship score relating the documents.

In some examples, the text editor object 106 may include additional code for implementing additional methods. For example, the text editor object 106 may comprise tagging code 121. When executed by at least one processor of the computing system 104, the tagging code 121 may implement a tagging method. The tagging method may operate on a document 150 to tag concepts expressed in the document 150.

The tagging method may receive as input one or more documents 150. The tagging method may act on the one or more documents to identify text strings indicating one or more of the concepts associated with concept objects 108, 110, 112. In some examples, the tagging method may access description data of the respective concept objects 108, 110, 112 and use the description data to identify sets of one or more strings in the input document indicating the respective concepts. The tagging method may tag the document with an indication of the located concepts. In some examples, this includes writing tag data to the document. The tag data may describe concepts that are detected in the document. In this way, the document may be associated with the identified concepts. The tag data associates or links to particular text strings that are determined to express the concept. In some examples, in addition to or instead of executing the tagging method, one or more of the users 128, 130 may review documents and tag expressions of the respective concepts. In some examples, documents may be manually tagged by one or more users 128, 130 via user computing devices 132, 134.

In some examples, the software application 102 is arranged to communicate with various other computing systems including, for example, user computing devices 132, 134 and server computing devices 136, 138. User computing devices 132, 134 may be associated with respective users 128, 130. Users 128, 130 may utilize the software application 102 via the user computing devices 132, 134. User computing devices 132, 134 may be and/or include various different types of computing devices such as, for example, desktop computers, laptop computers, tablet computers, mobile computing devices, and/or the like.

Consider the example in which the software application 102 is a social media application. Users 128, 130 may be social media users who access the software application 102 remotely via an appropriate network. Consider also the example in which the software application 102 is a word processing application implemented in a cloud environment. The users 128, 130 may access the software application 102 via the user computing devices 132, 134 using an appropriate network.

Server computing devices 136, 138 may execute software applications that utilize the software application 102, for example, via one or more Application Programming Interface (API) calls. For example, server computing devices 136, 138 may access the computing system 104 and the software application 102 to prompt the software application 102 to perform textual analysis of one or more documents, for example, as described herein. Consider an example in which one or more of the server computing devices 136, 138 is programmed to train a machine learning model. The server computing device 136, 138 may query the software application 102 to receive a relationship score describing a difference between a training document being used to train the machine learning model and an output document generated by the machine learning model. The relationship score may be used to score an error of the machine learning model during training.

Figure 2:
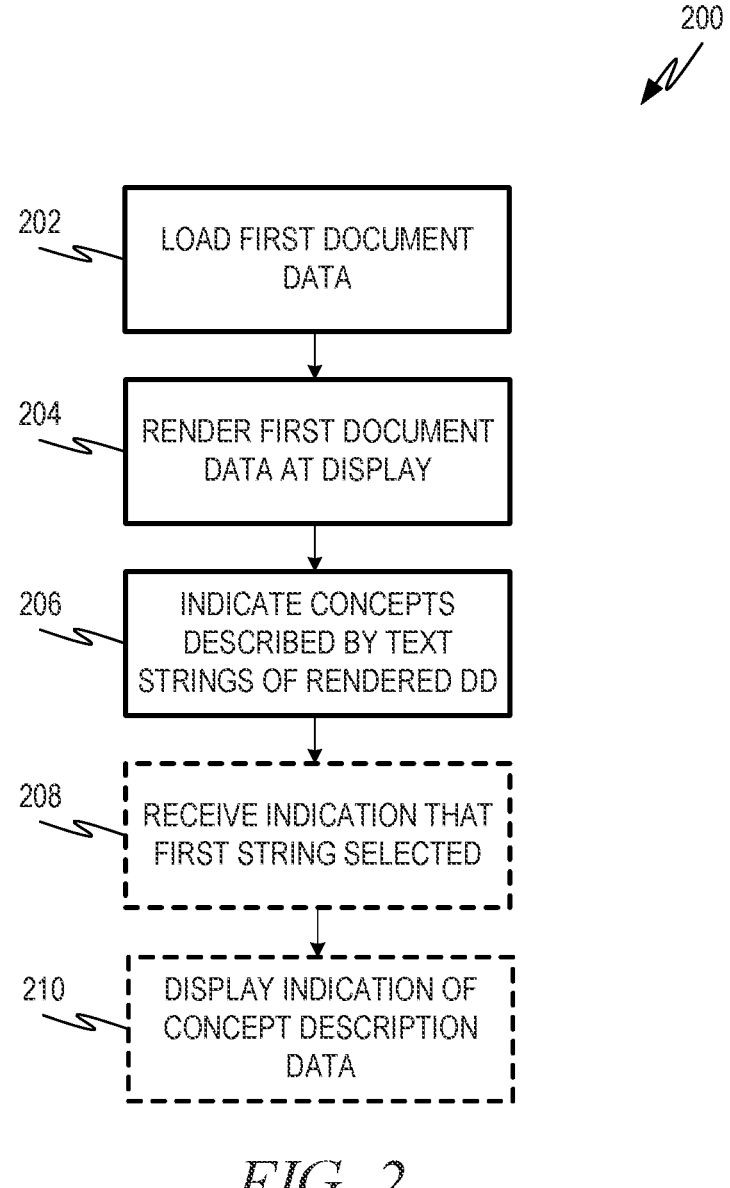
FIG. 2 is a flowchart showing one example of a process flow that may be executed in the environment of FIG. 1 to display a document.

FIG. 2 is a flowchart showing one example of a process flow 200 that may be executed in the environment 100 of FIG. 1 to display a document. At operation 202, the software application 102 may execute a text editing method to load first document data. For example, the software application 102 may call the text editor object 106 to execute text editing code 120 implementing a load method. The first document data may be or describe a first document comprising a plurality of text strings, as described herein.

At operation 204, the software application 102 may execute a text editing method to render the first document data at a display, such as a display of one or more of the user computing devices 132, 134. For example, the software application 102 may call the text editor object 106 to execute text editing code 120 implementing a render method. At operation 206, the software application 102 may modify the rendering of the document to indicate concepts described by one or more of the text strings of the document. This may include, for example, identifying text strings of the document that indicate or express the concepts of the respective concept objects 108, 110, 112. Text strings indicating or expressing a concept may be identified, for example, by referring to the description data of respective concept objects 108, 110, 112. The rendering of the text strings may be modified in any suitable manner. In some examples, renderings of text strings indicating a concept associated with a concept object 108, 110, 112 may be modified in color, size, and/or the like.

At optional operation 208, the software application 102 may receive an indication that a user 128, 130 has selected a first string at the display, where the first string is associated with a first concept object. In response, at optional operation 210, the software application 102 may further modify the display to include a description of the first concept associated with the first concept object. For example, the description may be received and/or derived from description data of the first concept object.

Figure 3:
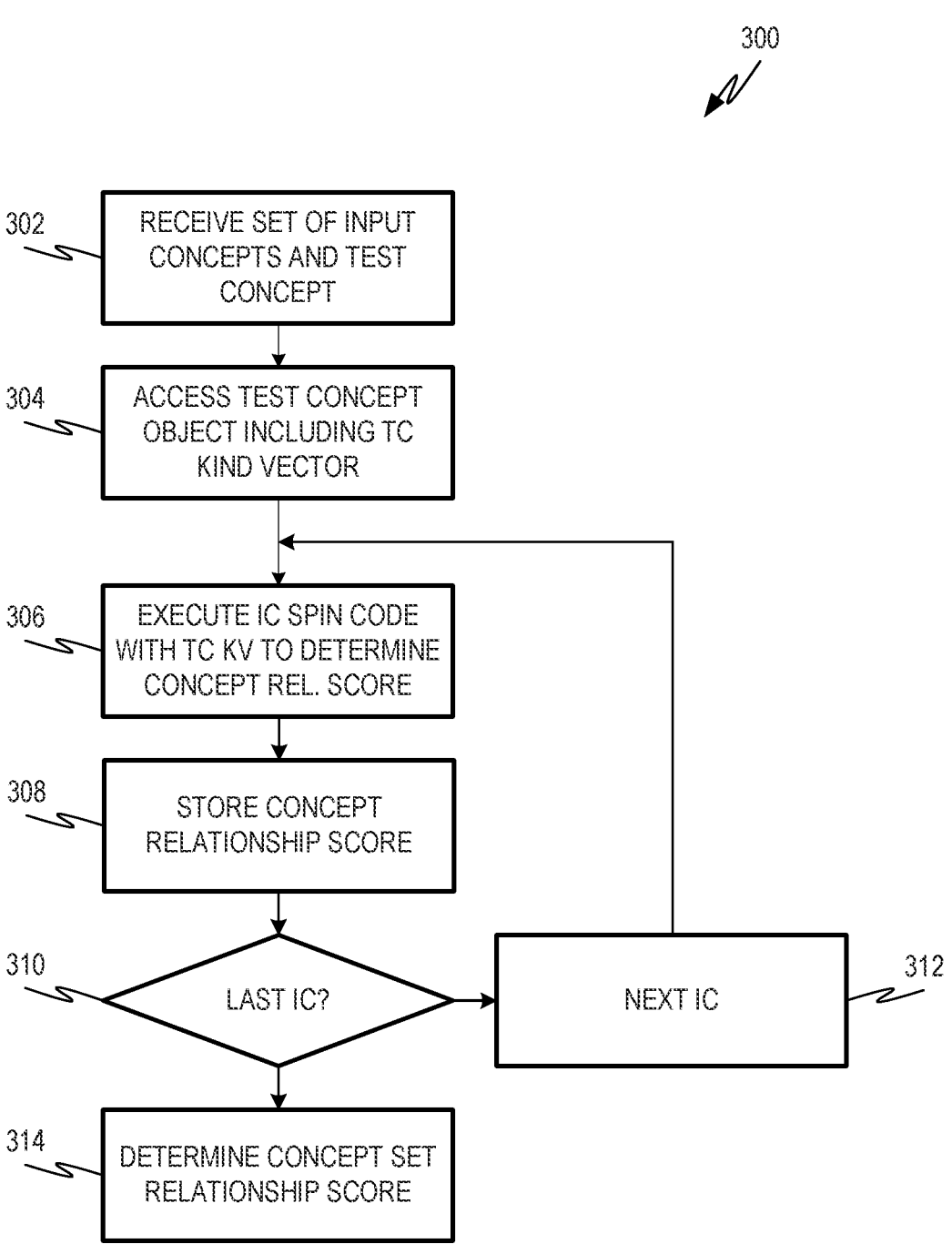
FIG. 3 is a flowchart showing one example of a process flow that may be executed by the software application of FIG. 1 to perform a tenor method upon execution of all or part of the tenor code.

FIG. 3 is a flowchart showing one example of a process flow 300 that may be executed by the software application 102. In various examples, the process flow 300 illustrates an example tenor method that may be performed upon execution of all or part of the tenor code 124. At operation 302, the tenor method may receive inputs. The inputs to the tenor method may include a set of input concept objects and a test concept object. The set of input concept objects and the test concept objects may be selected from the concept objects 108, 110, 112.

At operation 304, the tenor method may access the test concept object including, for example, test kind vector data from the test concept object. At operation 306, the tenor method may execute spin code from a first input concept object of the set of input concept objects using the test kind vector data. The result may be a set of concepts indicated by the test kind vector data that are also relevant to the first input concept object. This may be used, for example, to determine a concept relationship score describing a relationship between the test concept object and the first input concept object. For example, the concept relationship score may be derived from the output of the spin code. At operation 308, the tenor method may store the concept relationship score, for example, at a memory and/or persistent data storage of the computing system 104.

At operation 310, the tenor method may determine if it is operating on the last input concept object from the set of input concept objects. If it is not operating on the last input concept object of the set of concept objects, then the tenor method may, at operation 312, increment to a next input concept of the set of input concepts and return to operation 306. When the tenor method is operating on the last input concept object from the set of input concept objects, it may, at operation 314, determine a concept set relationship score. The concept set relationship score may describe a relationship between the test concept object and the set of input concept objects. The concept set relationship score may be determined from the concept relationship scores determined at operation 306 and stored at operation 308.

Figure 4:
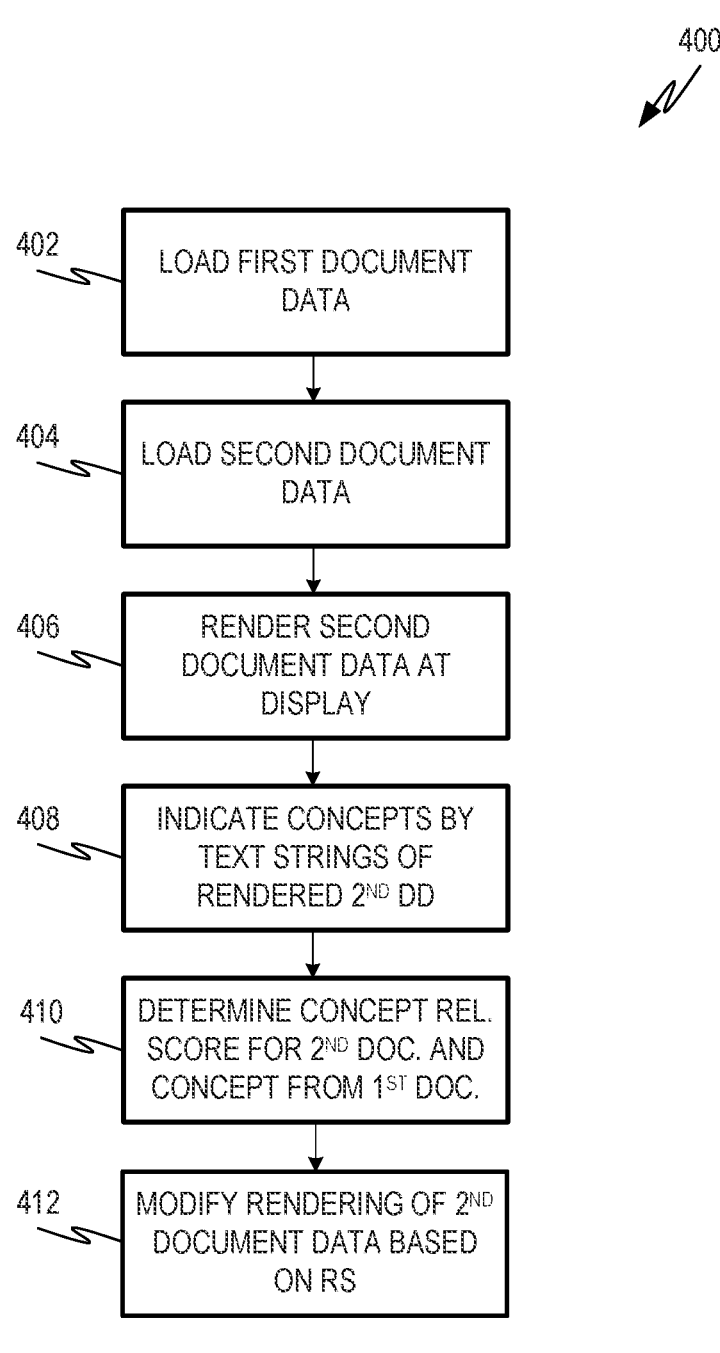
FIG. 4 is a flowchart showing one example of a process flow that may be executed by the text editor object of FIG. 1 to display a documents.

FIG. 4 is a flowchart showing one example of a process flow 400 that may be executed by the text editor object 106 to display a document. At operation 402, the text editor code 120 of the text editor object 106 may be executed to load first document data. At operation 404, the text editor code 120 of the text editor object 106 may be executed to load second document data. At operation 406, the text editor code 120 may be executed to render the second document data at a display. At operation 408, the text editor code 120 may be executed to modify the rendering of the second document data to indicate concepts expressed by text strings of the second document data.

At operation 410, the tenor code 124 of the tenor object 122 may be executed to determine a concept set relationship score for a set of concept objects of the concept objects 108, 110, 112 expressed or otherwise associated with the second document data and a first concept object expressed or otherwise associated with the first document data. At operation 412, the text editor code 120 may modify the rendering of the second document data based on the concept relationship score. For example, modifying the rendering may include marking one or more text strings from the second document data that also express a concept that is expressed by and/or described by the first document data.

Figure 5:
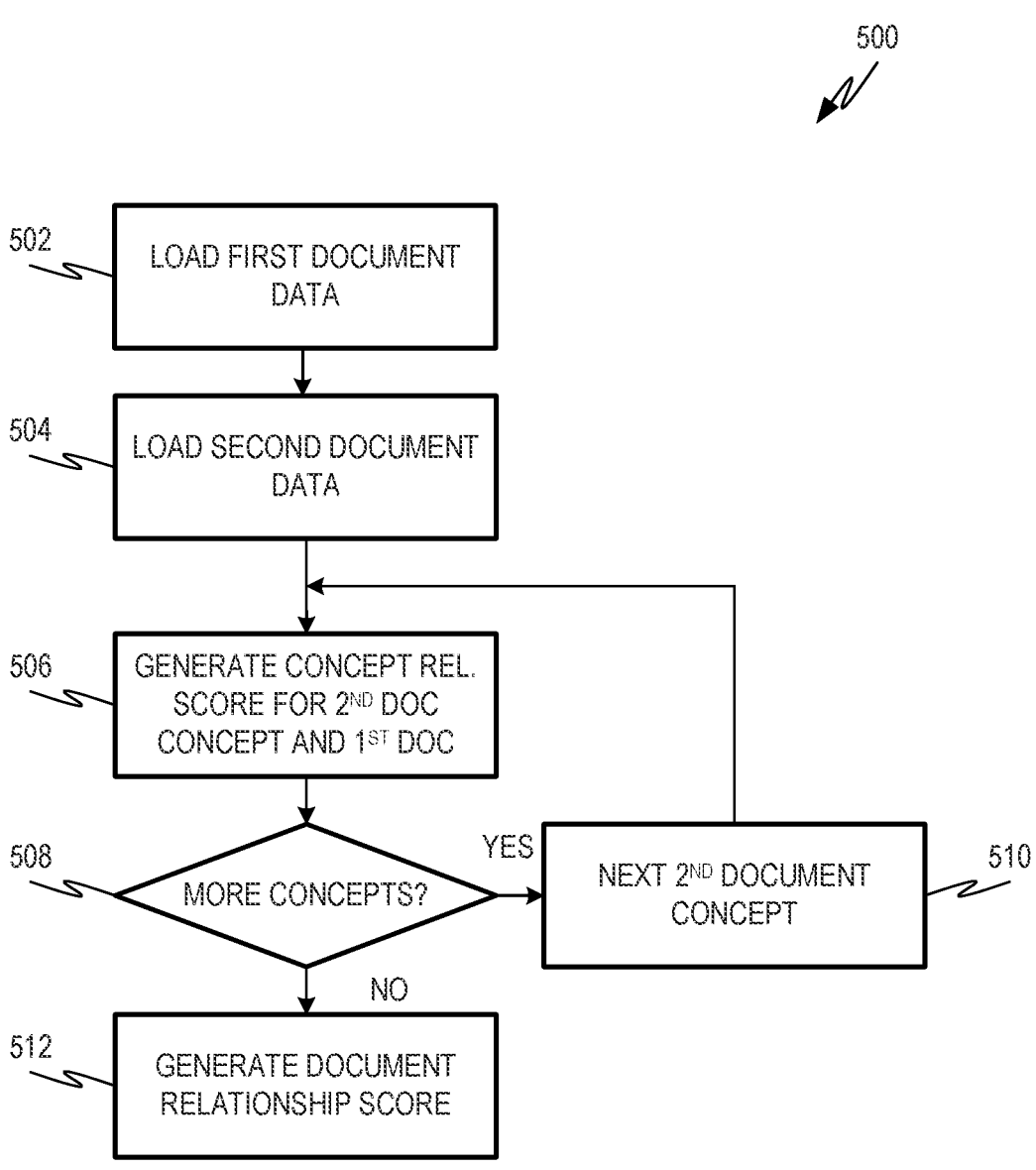
FIG. 5 is a flowchart showing one example of a process flow that may be executed by the text editor object of FIG. 1 to determine a document relationship score relating two documents.

FIG. 5 is a flowchart showing one example of a process flow 500 that may be executed by the text editor object 106 to determine a document relationship score relating two documents. At operation 502, the text editor code 120 may execute to load first document data. At operation 504, the text editor code may execute to load second document data. At operation 506, the text editor object 106 may generate a concept set relationship score for the first document and a first concept expressed by or otherwise associated with the second document. The concept set relationship score may be determined, for example, as described herein with respect to the process flow 300.

At operation 508, the text editor object 106 may determine if there are additional concept objects expressed by and/or associated with the second document. If there are one or more additional concept objects expressed by and/or associated with the second document, at operation 510, the text editor object 106 may increment to the next object from the second document and return to operation 506.

If there are no additional concept objects expressed by and/or associated with the second document, the text editor object 106 (e.g. the tenor code 124 thereof) may generate a document relationship score at operation 512. The document relationship score may be generated from the concept set relationship scores determined at operation 506 across the concept objects expressed by and/or associated with the second document.

Figure 6:
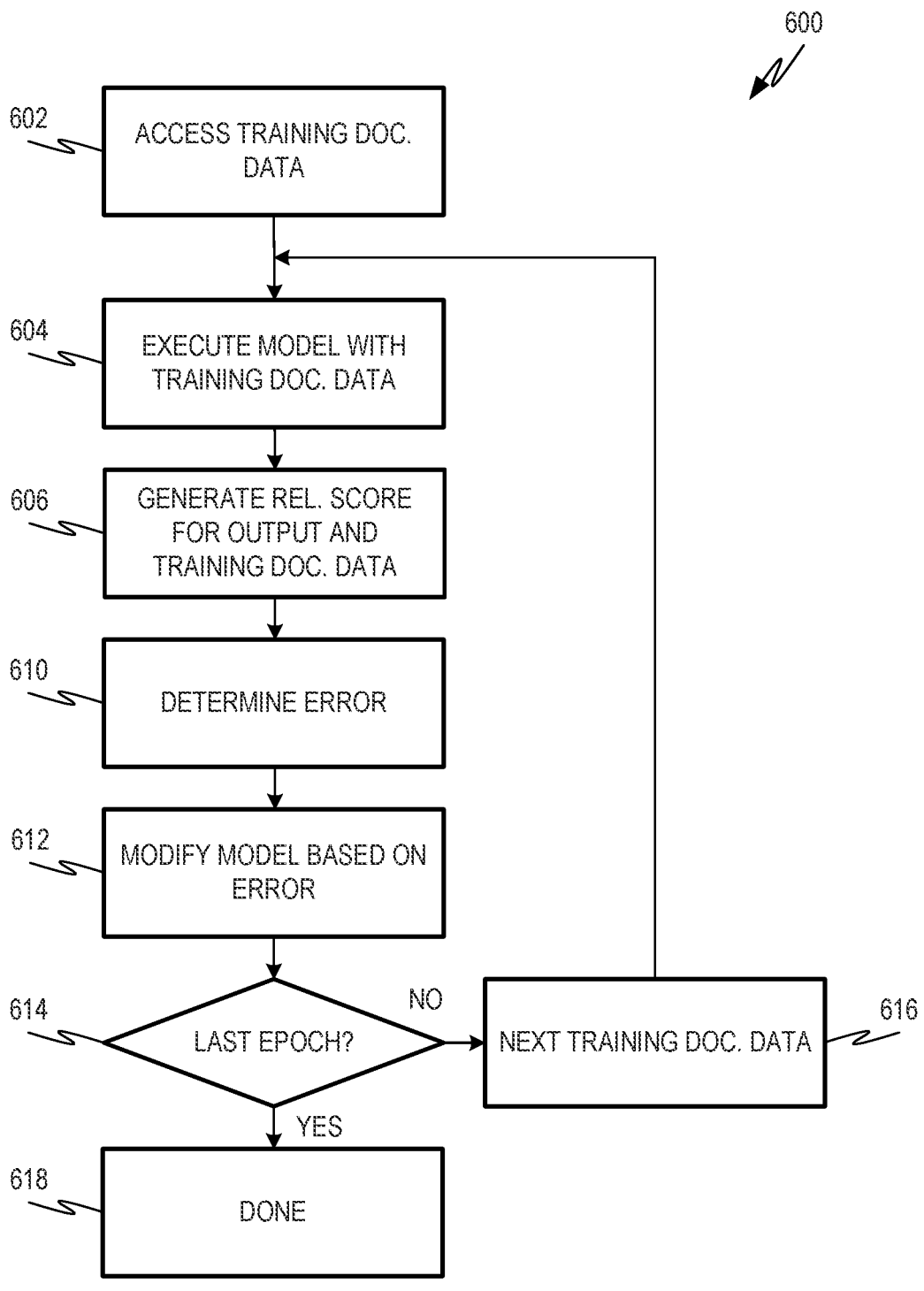
FIG. 6 is a flowchart showing one example of a process flow that may be executed by the software application of FIG. 1 to train a computerized model using the text editor object described herein.

FIG. 6 is a flowchart showing one example of a process flow 600 that may be executed by the software application 102 to train a computerized model using the text editor object 106 described herein. The computerized model may be or include any suitable type of computerized model including, for example, a logistic regression model, a decision tree model, a random forest model, a support vector machine model, a K-nearest neighbors model, a gradient boosting model, an Adaptive Boosting (AdaBoost) model, a neural network model, an extreme Gradient Boosting (XG-Boost) model, and/or the like.

The computerized model, in some examples, may be configured to act on one or more documents or other text data. For example, the computerized model may be a generative model that generates documents or other text data. In other examples, the computerized model may be trained to identify one or more concepts expressed by a document or other text data. Other suitable document-related tasks may be performed by the computerized model.

At operation 602, the software application 102 may access training document data. The training document data may comprise one or more documents 150. At operation 604, the software application 102 may execute the computerized model using the training document data as input. For example, the software application 102 may execute the computerized model using a single training document as input. The output of the computerized model may be based on the training document data. For example, a generative model may generate an output document or documents based on the input data. A model trained to output concepts expressed by the training document data may generate an output concept and/or the like.

At operation 606, the software application 102 may generate a relationship score relating the output of the computerized model to the training data. The relationship score may indicate how closely the output of the computerized model approximates the training data. In an example in which the output of the computerized model is a concept, the relationship score may be a concept set relationship score describing the relationship between the concept output by the model and the concept objects expressed by the training document data. The concept set relationship score may be determined as described herein, for example, with respect to the process flow 400. In an example in which the output of the computerized model is a document, the relationship score may be a document relationship score determined, for example, as described herein with respect to the process flow 500.

At operation 610, the software application 102 may determine an error of the computerized model using the relationship score. At operation 612, the software application 102 may modify the computerized model based on the error. In some examples, the software application 102 is configured to apply a gradient descent technique to a loss function describing a difference between the result of the computerized model and the relationship score. At operation 614, the software application 102 may determine if the current training epoch is the last epoch. If the current training epoch is not the last epoch to be executed, then the software application may consider next training document data at operation 616 and then return to operation 604. If the current training epoch is the last epoch, then the training may complete at operation 618.

In view of the disclosure above, various examples are set forth below. It should be noted that one or more features of an example, taken in isolation or combination, should be considered within the disclosure of this application.

Examples: Example 1 is a hardware computing system for processing at least one document, the hardware computing system comprising: a data storage device comprising: a text editor object comprising: text editing code executable to operate on the at least one document; a plurality of concept objects, a first concept object of the plurality of concept objects comprising: first concept description data describing a first concept; first kind vector data describing relationships between the first concept and a plurality of other concepts; and first concept spin code executable to transform kind vector data describing a different concept object into kind vector data describing the first concept; and a tenor object comprising tenor code executable to relate a first set of concept objects of the plurality of concept objects to another concept object; and at least one processor programmed to perform operations comprising: executing the tenor code to perform operations comprising: accessing a set of concept spin codes from a first set of concept objects, the set of concept spin codes comprising the first concept spin code; accessing test concept kind vector data from a test concept object; and using the set of concept spin codes and the test concept kind vector data to determine a first concept set relationship score describing a relationship between the first set of concept objects and the test concept object.

In Example 2, the subject matter of Example 1 optionally includes the executing of the tenor code being to perform operations further comprising: loading a first document comprising a first plurality of text strings, the first document being associated with the first set of concept objects; and loading a second document comprising a second plurality of text strings, the second document being associated with a second set of the plurality of concept objects, the second set of the plurality of concept objects comprising the test concept object, and the first concept set relationship score describing a relationship between the first document and the second document.

In Example 3, the subject matter of Example 2 optionally includes the second set of the plurality of concept objects also comprising a second test concept object, the executing of the tenor code being to perform operations further comprising: accessing second test concept kind vector data from the second test concept object; using the set of concept spin codes and the second test concept kind vector data to determine a second concept set relationship score describing a relationship between the first set of concept objects and the second test concept object; and determining a document relationship score describing a relationship between the first document and the second document, the document relationship score being based at least in part on the first concept set relationship score and the second concept set relationship score.

In Example 4, the subject matter of any one or more of Examples 1-3 optionally include the executing the tenor code being to perform operations further comprising executing the first concept spin code to transform the test concept kind vector data into a first derived kind vector describing the first concept, the first concept set relationship score being based at least in part on the first derived kind vector.

In Example 5, the subject matter of any one or more of Examples 1-4 optionally include the at least one processor being further programmed to perform operations comprising: loading a first document comprising a first plurality of text strings, the first document being associated with the first set of concept objects; displaying indications of the first plurality of text strings on a display device; using the first concept description data to determine a portion of the first plurality of text strings that express the first concept; and modifying the indications of the first plurality of text strings at the display device such that indications corresponding to the portion of the first plurality of text strings indicate the first concept.

In Example 6, the subject matter of Example 5 optionally includes the modifying of the indications of the first plurality of text strings at the display device comprising modifying a first indication of a first text string to comprise a link that, when selected by a user, causes the at least one processor to display, at the display device, at least a portion of the first concept description data.

In Example 7, the subject matter of any one or more of Examples 5-6 optionally include the at least one processor being programmed to perform operations further comprising modifying the indications of the first plurality of text strings at the display device to indicate the first concept set relationship score.

In Example 8, the subject matter of any one or more of Examples 1-7 optionally include the at least one processor being further programmed to perform operations comprising: executing a computerized model based at least in part on a first document to generate a first output; using the first concept set relationship score to determine an error describing the computerized model; and modifying the computerized model based at least in part on the error.

Example 9 is a computer-implemented method for processing at least one document, the method comprising: storing, by at least one processor, a text editor object, the text editor object comprising: text editing code executable to operate on the at least one document; a plurality of concept objects, a first concept object of the plurality of concept objects comprising: first concept description data describing a first concept; first kind vector data describing relationships between the first concept and a plurality of other concepts; and first concept spin code executable to transform kind vector data describing a different concept object into kind vector data describing the first concept; and a tenor object comprising tenor code executable to relate a first set of concept objects of the plurality of concept objects to another concept object; and executing, by the at least one processor, the tenor code to perform operations comprising: accessing a set of concept spin codes from a first set of concept objects, the set of concept spin codes comprising the first concept spin code; accessing test concept kind vector data from a test concept object; and using the set of concept spin codes and the test concept kind vector data to determine a first concept set relationship score describing a relationship between the first set of concept objects and the test concept object.

In Example 10, the subject matter of Example 9 optionally includes the executing of the tenor code being to perform operations further comprising: loading a first document comprising a first plurality of text strings, the first document being associated with the first set of concept objects; and loading a second document comprising a second plurality of text strings, the second document being associated with a second set of the plurality of concept objects, the second set of the plurality of concept objects comprising the test concept object, and the first concept set relationship score describing a relationship between the first document and the second document.

In Example 11, the subject matter of Example 10 optionally includes the second set of the plurality of concept objects also comprising a second test concept object, the executing of the tenor code being to perform operations further comprising: accessing second test concept kind vector data from the second test concept object; using the set of concept spin codes and the second test concept kind vector data to determine a second concept set relationship score describing a relationship between the first set of concept objects and the second test concept object; and determining a document relationship score describing a relationship between the first document and the second document, the document relationship score being based at least in part on the first concept set relationship score and the second concept set relationship score.

In Example 12, the subject matter of any one or more of Examples 9-11 optionally include the executing the tenor code being to perform operations further comprising executing the first concept spin code to transform the test concept kind vector data into a first derived kind vector describing the first concept, the first concept set relationship score being based at least in part on the first derived kind vector.

In Example 13, the subject matter of any one or more of Examples 9-12 optionally include loading a first document comprising a first plurality of text strings, the first document being associated with the first set of concept objects; displaying indications of the first plurality of text strings on a display device; using the first concept description data to determine a portion of the first plurality of text strings that express the first concept; and modifying the indications of the first plurality of text strings at the display device such that indications corresponding to the portion of the first plurality of text strings indicate the first concept.

In Example 14, the subject matter of Example undefined optionally includes, the executing of the tenor code being to perform operations further comprising: loading a first document comprising a first plurality of text strings, the first document being associated with the first set of concept objects; and loading a second document comprising a second plurality of text strings, the second document being associated with a second set of the plurality of concept objects, the second set of the plurality of concept objects comprising the test concept object, and the first concept set relationship score describing a relationship between the first document and the second document.

In Example 15, the subject matter of Example 14 optionally includes the second set of the plurality of concept objects also comprising a second test concept object, the executing of the tenor code being to perform operations further comprising: accessing second test concept kind vector data from the second test concept object; using the set of concept spin codes and the second test concept kind vector data to determine a second concept set relationship score describing a relationship between the first set of concept objects and the second test concept object; and determining a document relationship score describing a relationship between the first document and the second document, the document relationship score being based at least in part on the first concept set relationship score and the second concept set relationship score.

In Example 16, the subject matter of Example undefined optionally includes, the executing the tenor code being to perform operations further comprising executing the first concept spin code to transform the test concept kind vector data into a first derived kind vector describing the first concept, the first concept set relationship score being based at least in part on the first derived kind vector.

In Example 17, the subject matter of any one or more of Examples 13-16 optionally include the modifying of the indications of the first plurality of text strings at the display device comprising modifying a first indication of a first text string to comprise a link that, when selected by a user, causes the at least one processor to display, at the display device, at least a portion of the first concept description data.

In Example 18, the subject matter of any one or more of Examples 13-17 optionally include modifying the indications of the first plurality of text strings at the display device to indicate the first concept set relationship score.

In Example 19, the subject matter of any one or more of Examples 9-18 optionally include executing a computerized model based at least in part on a first document to generate a first output; using the first concept set relationship score to determine an error describing the computerized model; and modifying the computerized model based at least in part on the error.

Example 20 is a non-transitory machine-readable medium comprising instructions thereon that, when executed by at least one processor, cause the at least one processor to perform operations comprising: storing a text editor object, the text editor object comprising: text editing code executable to operate on at least one document; a plurality of concept objects, a first concept object of the plurality of concept objects comprising: first concept description data describing a first concept; first kind vector data describing relationships between the first concept and a plurality of other concepts; and first concept spin code executable to transform kind vector data describing a different concept object into kind vector data describing the first concept; and a tenor object comprising tenor code executable to relate a first set of concept objects of the plurality of concept objects to another concept object; and executing the tenor code to perform operations comprising: accessing a set of concept spin codes from a first set of concept objects, the set of concept spin codes comprising the first concept spin code; accessing test concept kind vector data from a test concept object; and using the set of concept spin codes and the test concept kind vector data to determine a first concept set relationship score describing a relationship between the first set of concept objects and the test concept object.

Figure 7:
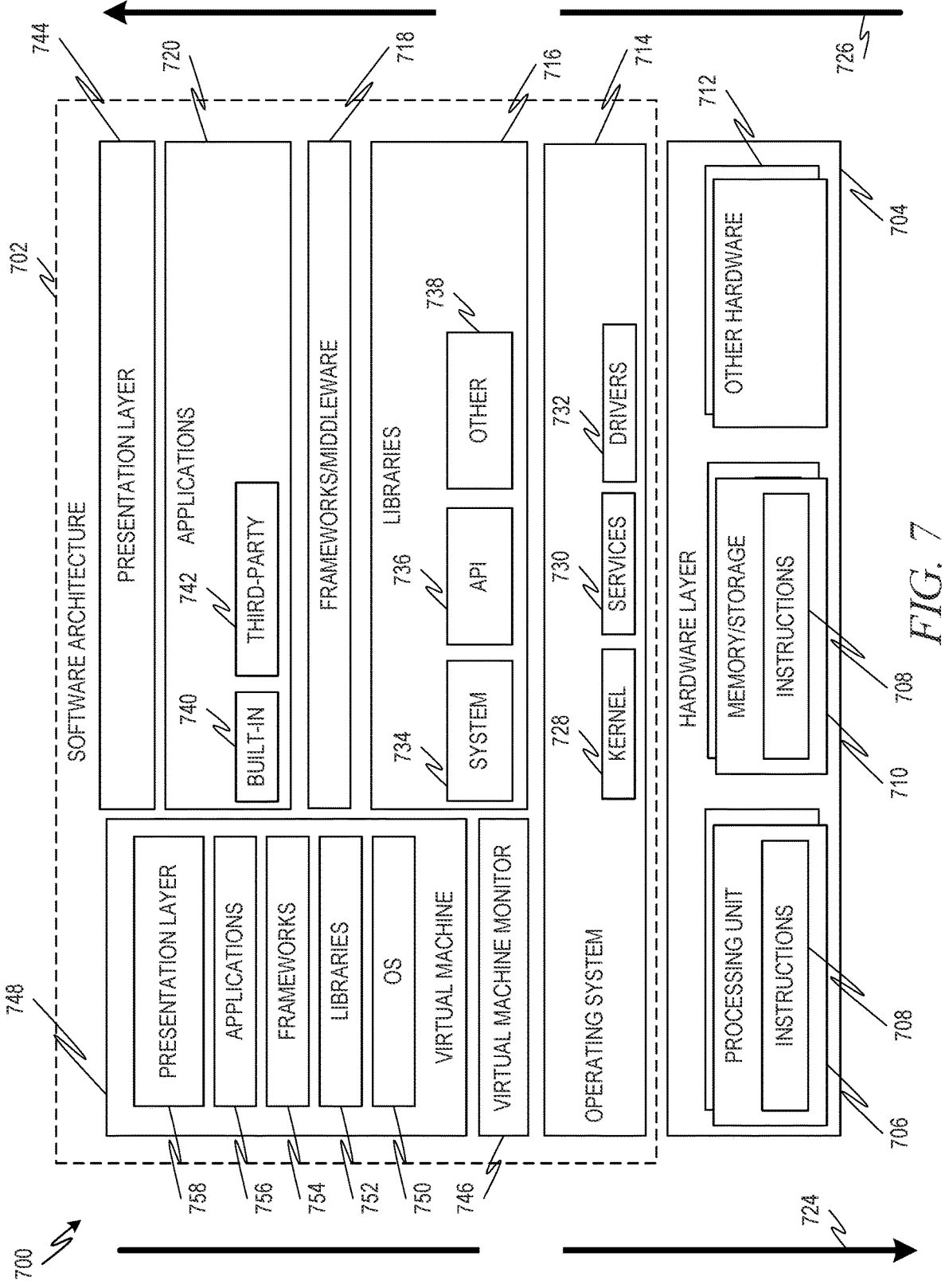
FIG. 7 is a block diagram showing one example of a software architecture for a computing device.

FIG. 7 is a block diagram 700 showing one example of a software architecture 702 for a computing device. The architecture 702 may be used in conjunction with various hardware architectures, for example, as described herein. FIG. 7 is merely a non-limiting example of a software architecture and many other architectures may be implemented to facilitate the functionality described herein. The software architecture 702 and various other components described in FIG. 7 may be used to implement various other systems described herein. For example, the software architecture 702 shows one example way for implementing the computing system 104.

In FIG. 7, a representative hardware layer 704 is illustrated and can represent, for example, any of the above referenced computing devices. In some examples, the hardware layer 704 may be implemented according to the architecture of the computer system of FIG. 7.

The representative hardware layer 704 comprises one or more processing units 706 having associated executable instructions 708. Executable instructions 708 represent the executable instructions of the software architecture 702, including implementation of the methods, modules, subsystems, and components, and so forth described herein and may also include memory and/or storage modules 710, which also have executable instructions 708. Hardware layer 704 may also comprise other hardware as indicated by other hardware 712 which represents any other hardware of the hardware layer 704, such as the other hardware illustrated as part of the architecture 702.

In the example architecture of FIG. 7, the software architecture 702 may be conceptualized as a stack of layers where each layer provides particular functionality. For example, the software architecture 702 may include layers such as an operating system 714, libraries 716, middleware layer 718 (sometimes referred to as frameworks), applications 720, and presentation layer 744. Operationally, the applications 720 and/or other components within the layers may invoke API calls 724 through the software stack and access a response, returned values, and so forth illustrated as messages 726 in response to the API calls 724. The layers illustrated are representative in nature and not all software architectures have all layers. For example, some mobile or special purpose operating systems may not provide the middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of an interrupt and, in response, cause the architecture 702 to pause its current processing and execute an interrupt service routine (ISR) when an interrupt is accessed.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 716 may include system 734 libraries (e.g., C standard library) that may provide functions such as memory allocation functions, string manipulation functions, mathematic functions, and/or the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and/or the like. The libraries 716 may also include a wide variety of other libraries 738 to provide many other APIs to the applications 720 and other software components/modules.

The middleware layer 718 (also sometimes referred to as middleware) may provide a higher-level common infrastructure that may be utilized by the applications 720 and/or other software components/modules. For example, the middleware layer 718 may provide various graphical user interface (GUI) functions, high-level resource management, high-level location services, and so forth. The middleware layer 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any of the built-in applications 740 as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 742 may invoke the API calls 724 provided by the mobile operating system such as operating system 714 to facilitate functionality described herein.

The applications 720 may utilize built-in operating system functions (e.g., kernel 728, services 730 and/or drivers 732), libraries (e.g., system 734, API libraries 736, and other libraries 738), and middleware layer 718 to create user interfaces to interact with users of the system. Alternatively, or additionally, in some systems interactions with a user may occur through a presentation layer, such as presentation layer 744. In these systems, the application/module "logic" can be separated from the aspects of the application/module that interact with a user.

Some software architectures utilize virtual machines. For example, the various environments described herein may implement one or more virtual machines executing to provide a software application or service. The example of FIG. 7 illustrates by virtual machine 748. A virtual machine creates a software environment where applications/modules can execute as if they were executing on a hardware computing device. A virtual machine 748 is hosted by a host operating system (operating system 714) and typically, although not always, has a virtual machine monitor 746, which manages the operation of the virtual machine 748 as well as the interface with the host operating system (i.e., operating system 714). A software architecture executes within the virtual machine 748 such as an operating system 750, libraries 752, frameworks/middleware 754, applications 756 and/or presentation layer 758. These layers of software architecture executing within the virtual machine 748 can be the same as corresponding layers previously described or may be different.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

Computer software, including code for implementing software services can be written in any form of programming language, including compiled or interpreted languages, and it can be deployed in any form, including as a standalone program or as a module, subroutine, or other unit suitable for use in a computing environment. Computer software can be deployed to be executed on one computer or on multiple computers at one site or distributed across multiple sites and interconnected by a communication network.

In example embodiments, operations may be performed by one or more programmable processors executing a computer program to perform functions by operating on input data and generating output.

Figure 8:
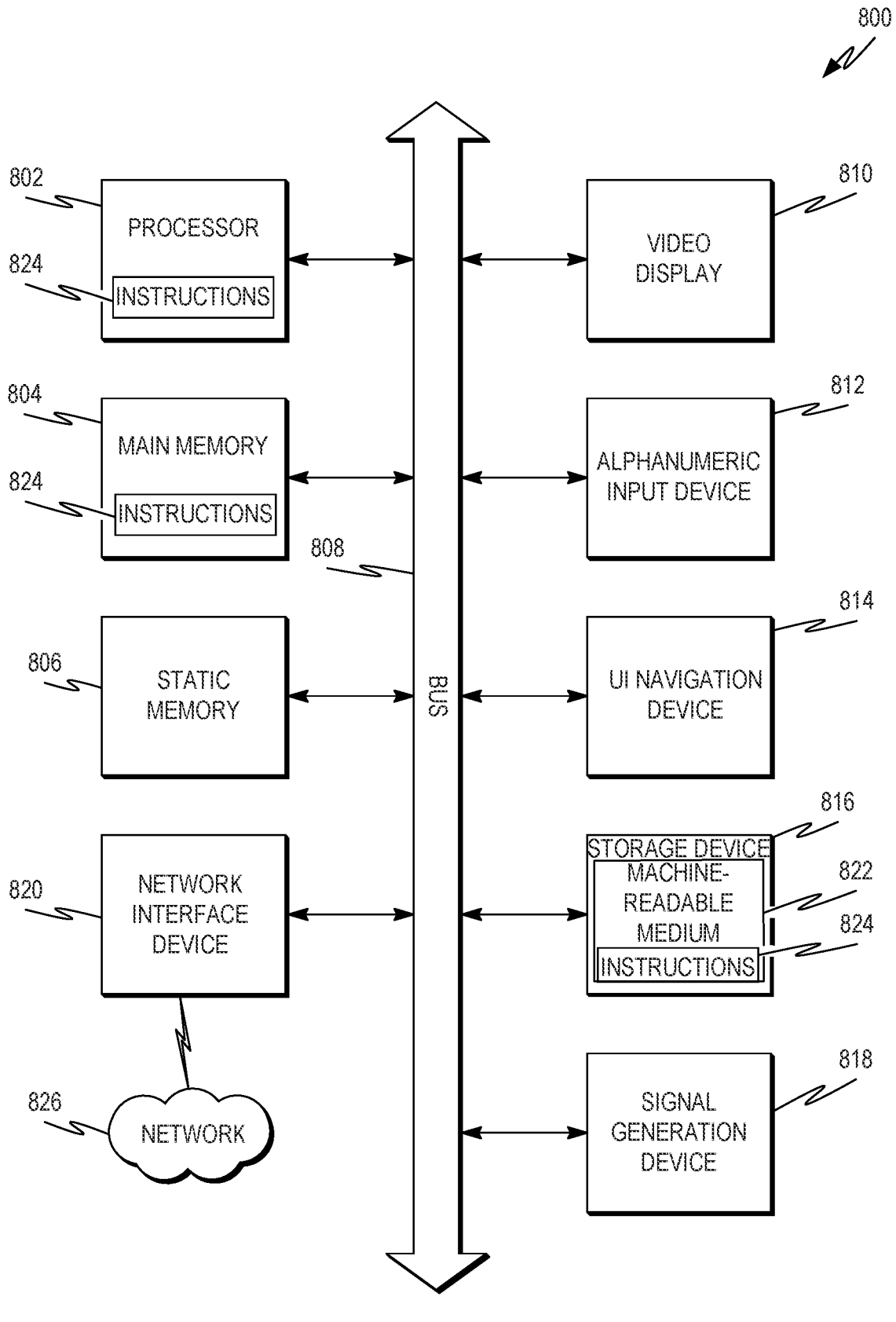
FIG. 8 is a block diagram of a machine in the example form of a computer system within which instructions may be executed for causing the machine to perform any one or more of the methodologies discussed herein.

FIG. 8 is a block diagram of a machine in the example form of a computer system 800 within which instructions 824 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface navigation (or cursor control) device 814 (e.g., a mouse), a disk drive unit 816, a signal generation device 818 (e.g., a speaker), and a network interface device 820.

The disk drive unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media 822.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 824 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A hardware computing system for processing at least one document, the hardware computing system comprising:
a data storage device comprising:

a text editor object comprising:
text editing code executable to operate on the at least one document;
a plurality of concept objects, a first concept object of the plurality of concept objects comprising:
first concept description data describing a first concept;
first kind vector data describing relationships between the first concept and a plurality of other concepts; and
first concept spin code executable to transform kind vector data describing a different concept object into kind vector data describing the first concept; and
a tenor object comprising tenor code executable to relate a first set of concept objects of the plurality of concept objects to another concept object; and
at least one processor programmed to perform operations comprising:
executing the tenor code to perform operations comprising:
accessing a set of concept spin codes from a first set of concept objects, the set of concept spin codes comprising the first concept spin code;
accessing test concept kind vector data from a test concept object; and
using the set of concept spin codes and the test concept kind vector data to determine a first concept set relationship score describing a relationship between the first set of concept objects and the test concept object.

2. The hardware computing system of claim 1, the executing of the tenor code being to perform operations further comprising:
loading a first document comprising a first plurality of text strings, the first document being associated with the first set of concept objects; and
loading a second document comprising a second plurality of text strings, the second document being associated with a second set of the plurality of concept objects, the second set of the plurality of concept objects comprising the test concept object, and the first concept set relationship score describing a relationship between the first document and the second document.

3. The hardware computing system of claim 2, the second set of the plurality of concept objects also comprising a second test concept object, the executing of the tenor code being to perform operations further comprising:
accessing second test concept kind vector data from the second test concept object;
using the set of concept spin codes and the second test concept kind vector data to determine a second concept set relationship score describing a relationship between the first set of concept objects and the second test concept object; and
determining a document relationship score describing a relationship between the first document and the second document, the document relationship score being based at least in part on the first concept set relationship score and the second concept set relationship score.

4. The hardware computing system of claim 1, the executing the tenor code being to perform operations further comprising executing the first concept spin code to transform the test concept kind vector data into a first derived kind vector describing the first concept, the first concept set relationship score being based at least in part on the first derived kind vector.

5. The hardware computing system of claim 1, the at least one processor being further programmed to perform operations comprising:

loading a first document comprising a first plurality of text strings, the first document being associated with the first set of concept objects;

displaying indications of the first plurality of text strings on a display device;

using the first concept description data to determine a portion of the first plurality of text strings that express the first concept; and modifying the indications of the first plurality of text strings at the display device such that indications corresponding to the portion of the first plurality of text strings indicate the first concept.

6. The hardware computing system of claim 5, the modifying of the indications of the first plurality of text strings at the display device comprising modifying a first indication of a first text string to comprise a link that, when selected by a user, causes the at least one processor to display, at the display device, at least a portion of the first concept description data.

7. The hardware computing system of claim 5, the at least one processor being programmed to perform operations further comprising modifying the indications of the first plurality of text strings at the display device to indicate the first concept set relationship score.

8. The hardware computing system of claim 1, the at least one processor being further programmed to perform operations comprising:

executing a computerized model based at least in part on a first document to generate a first output;

using the first concept set relationship score to determine an error describing the computerized model; and modifying the computerized model based at least in part on the error.

9. A computer-implemented method for processing at least one document, the method comprising:

storing, by at least one processor, a text editor object, the text editor object comprising:

text editing code executable to operate on the at least one document;

a plurality of concept objects, a first concept object of the plurality of concept objects comprising:

first concept description data describing a first concept;

first kind vector data describing relationships between the first concept and a plurality of other concepts; and first concept spin code executable to transform kind vector data describing a different concept object into kind vector data describing the first concept; and a tenor object comprising tenor code executable to relate a first set of concept objects of the plurality of concept objects to another concept object; and executing, by the at least one processor, the tenor code to perform operations comprising:

accessing a set of concept spin codes from a first set of concept objects, the set of concept spin codes comprising the first concept spin code;

accessing test concept kind vector data from a test concept object; and using the set of concept spin codes and the test concept kind vector data to determine a first concept set relationship score describing a relationship between the first set of concept objects and the test concept object.

10. The computer-implemented method of claim 9, the executing of the tenor code being to perform operations further comprising:

loading a first document comprising a first plurality of text strings, the first document being associated with the first set of concept objects; and loading a second document comprising a second plurality of text strings, the second document being associated with a second set of the plurality of concept objects, the second set of the plurality of concept objects comprising the test concept object, and the first concept set relationship score describing a relationship between the first document and the second document.

11. The computer-implemented method of claim 10, the second set of the plurality of concept objects also comprising a second test concept object, the executing of the tenor code being to perform operations further comprising:

accessing second test concept kind vector data from the second test concept object;

using the set of concept spin codes and the second test concept kind vector data to determine a second concept set relationship score describing a relationship between the first set of concept objects and the second test concept object; and determining a document relationship score describing a relationship between the first document and the second document, the document relationship score being based at least in part on the first concept set relationship score and the second concept set relationship score.

12. The computer-implemented method of claim 9, the executing the tenor code being to perform operations further comprising executing the first concept spin code to transform the test concept kind vector data into a first derived kind vector describing the first concept, the first concept set relationship score being based at least in part on the first derived kind vector.

13. The computer-implemented method of claim 9, further comprising:

loading a first document comprising a first plurality of text strings, the first document being associated with the first set of concept objects;

displaying indications of the first plurality of text strings on a display device;

using the first concept description data to determine a portion of the first plurality of text strings that express the first concept; and modifying the indications of the first plurality of text strings at the display device such that indications corresponding to the portion of the first plurality of text strings indicate the first concept.

14. The computer-implemented method of claim 13, the modifying of the indications of the first plurality of text strings at the display device comprising modifying a first indication of a first text string to comprise a link that, when selected by a user, causes the at least one processor to display, at the display device, at least a portion of the first concept description data.

15. The computer-implemented method of claim 13, further comprising modifying the indications of the first plurality of text strings at the display device to indicate the first concept set relationship score.

16. The computer-implemented method of claim 9, further comprising:

executing a computerized model based at least in part on a first document to generate a first output;

using the first concept set relationship score to determine an error describing the computerized model; and modifying the computerized model based at least in part on the error.

17. A non-transitory machine-readable medium comprising instructions thereon that, when executed by at least one processor, cause the at least one processor to perform operations comprising:

storing a text editor object, the text editor object comprising:

text editing code executable to operate on at least one document;

a plurality of concept objects, a first concept object of the plurality of concept objects comprising:

first concept description data describing a first concept;

first kind vector data describing relationships between the first concept and a plurality of other concepts; and first concept spin code executable to transform kind vector data describing a different concept object into kind vector data describing the first concept; and a tenor object comprising tenor code executable to relate a first set of concept objects of the plurality of concept objects to another concept object; and executing the tenor code to perform operations comprising:

accessing a set of concept spin codes from a first set of concept objects, the set of concept spin codes comprising the first concept spin code;

accessing test concept kind vector data from a test concept object; and using the set of concept spin codes and the test concept kind vector data to determine a first concept set relationship score describing a relationship between the first set of concept objects and the test concept object.

18. The non-transitory machine-readable medium of claim 17, the executing of the tenor code being to perform operations further comprising:

loading a first document comprising a first plurality of text strings, the first document being associated with the first set of concept objects; and loading a second document comprising a second plurality of text strings, the second document being associated with a second set of the plurality of concept objects, the second set of the plurality of concept objects comprising the test concept object, and the first concept set relationship score describing a relationship between the first document and the second document.

19. The non-transitory machine-readable medium of claim 18, the second set of the plurality of concept objects also comprising a second test concept object, the executing of the tenor code being to perform operations further comprising:

accessing second test concept kind vector data from the second test concept object;

using the set of concept spin codes and the second test concept kind vector data to determine a second concept set relationship score describing a relationship between the first set of concept objects and the second test concept object; and determining a document relationship score describing a relationship between the first document and the second document, the document relationship score being based at least in part on the first concept set relationship score and the second concept set relationship score.

20. The non-transitory machine-readable medium of claim 17, the executing the tenor code being to perform operations further comprising executing the first concept spin code to transform the test concept kind vector data into a first derived kind vector describing the first concept, the first concept set relationship score being based at least in part on the first derived kind vector.

* * * * *